J. L. DE STEIGER.
MACHINE SCREW.
APPLICATION FILED AUG. 5, 1908.
933,831.
Patented Sept. 14, 1909.
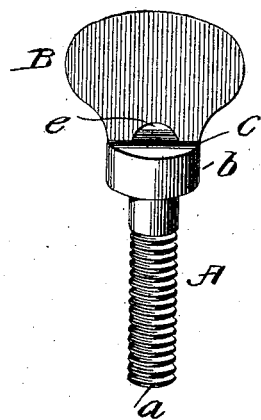
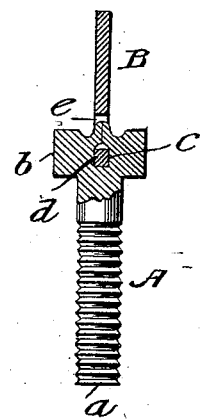
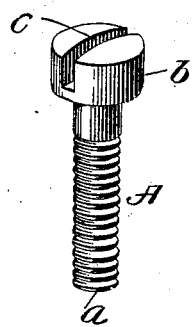
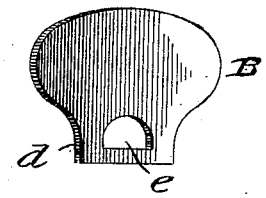
Witnesses
Frank Sheehy
Inventor
J. L. De Steiger
James J Sheehy
Attorney

UNITED STATES PATENT OFFICE.

JOSEPH L. DE STEIGER, OF LA SALLE, ILLINOIS.

MACHINE-SCREW.

933,831.  Specification of Letters Patent. Patented Sept. 14, 1909.

Application filed August 5, 1908. Serial No. 447,059.

*To all whom it may concern:*

Be it known that I, JOSEPH L. DE STEIGER, residing at La Salle, in the county of Lasalle and State of Illinois, have invented new and useful Improvements in Machine-Screws, of which the following is a specification.

My invention pertains to machine screws and analogous devices; and it contemplates the provision of a machine screw, ordinary screw, nail or the like, having a finger-piece which is initially formed separate from the major portion of the screw or the like and is subsequently fixed in a simple but strong and durable manner to said major portion.

With the foregoing in mind, the novelty, utility and practical advantages of my invention will be fully understood from the following description and claim when the same are read in connection with the drawings, accompanying and forming part of this specification, in which:

Figure 1 is a perspective view on an enlarged scale of a machine screw having a finger piece permanently connected to its major portion in accordance with my invention. Fig. 2 is a longitudinal central section taken through the screw in a plane at right angles to the kerf in the head of the screw. Fig. 3 is a perspective view showing the screw precedent to the application of the finger-piece thereto. Fig. 4 is a perspective view illustrating the finger-piece as the same appears prior to being permanently fixed on the remainder of the screw.

Similar letters designate corresponding parts in all of the views of the drawings, referring to which:

A is what is commonly known as a machine screw—that is to say, a screw having a threaded shank $a$ and a head $b$ in which is a kerf $c$, and B is a finger-piece constructed with a view of being permanently joined with the screw in accordance with my invention. The said finger-piece B may be of any configuration and of any material consonant with the purpose of my invention without involving departure from the scope of the invention as defined in the claim appended, though I prefer to make it of about the shape illustrated and to strike it from sheet-metal possessed of the requisite stiffness and strength.

As clearly illustrated in Figs. 2 and 4, the finger-piece B is provided with a portion $d$ corresponding in width to the length of the before mentioned kerf $c$, and is also provided in said portion $d$ with an aperture $e$; and in assembling the parts of my improved device the portion $d$ of the finger-piece is disposed in the kerf $c$ of the screw, after which portions of the screw head at opposite sides of the finger-piece are displaced and are forced against the opposite sides of the finger-piece and into the aperture $e$ thereof and together within said aperture $e$, Fig. 2. As will be obvious this operation may be expeditiously and easily accomplished and yet it results in the finger-piece B being fixed in the screw head in the kerf thereof in such manner that the finger-piece is strongly held against separation from the screw in any direction and at the same time is effectually prevented from working loose or moving with respect to the screw, this being due in large measure to the forcing of the portions of the screw-head together in the aperture $e$ of the finger-piece. It will further be manifest that when the screw A and the finger-piece B are joined in the manner described and best illustrated in Fig. 2, the screw or analogous device will, as a whole, present the appearance of a device formed in one piece, and will be quite as strong and durable as such a device.

My improvements are designed more especially for incorporation in machine screws and the like, but I would have it understood that without involving departure from the scope of my claimed invention, they may be embodied in screws of all kinds, and push pins and other devices.

Having described my invention, what I claim and desire to secure by Letters-Patent, is:

As a new article of manufacture, a device to be driven, comprising a shank, a diametrically-enlarged head formed integral with the shank and having a kerf extending throughout its diameter, and a diametrically-disposed finger-piece initially formed separate from the shank and the head thereof and having a transversely apertured portion $d$ corresponding in width to the length of the kerf in the head and in thickness to the width of said kerf and also having an outer portion of greater width than the portion $d$; the said portion $d$ of the finger-piece being disposed in the kerf of the head with its ends flush with the sides of the head, and portions of the head at opposite sides of the portion $d$ being forced against the sides of said portion and being also forced together within the transverse aperture $e$ in the portion $d$.

In testimony whereof I have hereunto set my hand in presence of two subscribing witnesses.

JOSEPH L. DE STEIGER.

Witnesses:
 CORNELIA MASON,
 ALBERT G. KNIGHT.